(12) United States Patent
Kranzley et al.

US011615396B2

(10) Patent No.: US 11,615,396 B2
(45) Date of Patent: *Mar. 28, 2023

(54) METHODS AND SYSTEMS FOR SECURE MOBILE DEVICE INITIATED PAYMENT USING GENERATED IMAGE DATA

(71) Applicant: MASTERCARD INTERNATIONAL INCORPORATED, Purchase, NY (US)

(72) Inventors: Arthur D. Kranzley, Pound Ridge, NY (US); John R. Wankmueller, Great Neck, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 296 days.

This patent is subject to a terminal disclaimer.

(21) Appl. No.: 16/734,794

(22) Filed: Jan. 6, 2020

(65) Prior Publication Data

US 2020/0143358 A1      May 7, 2020

Related U.S. Application Data

(60) Continuation of application No. 15/850,703, filed on Dec. 21, 2017, now Pat. No. 10,565,580, which is a division of application No. 12/475,735, filed on Jun. 1, 2009, now Pat. No. 9,881,297.

(Continued)

(51) Int. Cl.
*G06Q 20/00* (2012.01)
*G06Q 20/32* (2012.01)
(Continued)

(52) U.S. Cl.
CPC ......... *G06Q 20/3274* (2013.01); *G06Q 20/20* (2013.01); *G06Q 20/204* (2013.01); *G06Q 20/3263* (2020.05); *G06Q 40/00* (2013.01)

(58) Field of Classification Search
CPC .. G06Q 20/3274; G06Q 20/20; G06Q 20/204; G06Q 20/32; G06Q 40/00; G06Q 20/326
(Continued)

(56) References Cited

U.S. PATENT DOCUMENTS 5,883,810 A    3/1999    Franklin et al.
7,177,848 B2   2/2007    Hogan et al.
(Continued)

FOREIGN PATENT DOCUMENTS

EP    1231578 A2 *   8/2002    ......... G06Q 20/3229
GB    2362012 A  *  11/2001    ......... G06Q 20/3274
(Continued)

*Primary Examiner* — Russell S Glass
(74) *Attorney, Agent, or Firm* — Panitch Schwarze Belisario & Nadel LLP

(57) ABSTRACT

Systems, methods, processes, computer program code and means for conducting a payment transaction are provided which include activating a payment application of a mobile device, generating, using the payment application, an optical image representing payment account information associated with the payment application, said payment account information including at least one of a payment account number, an expiry date of the payment account number, and a dynamic verification code generated by the payment application; and presenting the optical image to a merchant transaction terminal for scanning to conduct the payment transaction.

13 Claims, 7 Drawing Sheets

Related U.S. Application Data

(60) Provisional application No. 61/114,593, filed on Nov. 14, 2008.

(51) Int. Cl.
*G06Q 20/20* (2012.01)
*G06Q 40/00* (2023.01)

(58) Field of Classification Search
USPC .......................................................... 705/17
See application file for complete search history.

(56) References Cited

U.S. PATENT DOCUMENTS

| | | |
|---|---|---|
| 10,565,580 B2 * | 2/2020 | Kranzley ................ G06Q 40/00 |
| 2002/0120584 A1 | 8/2002 | Hogan et al. |
| 2003/0233320 A1 | 12/2003 | Connor |
| 2005/0245271 A1 | 11/2005 | Vesuna |
| 2009/0192904 A1 | 7/2009 | Patterson et al. |
| 2010/0094735 A1 | 4/2010 | Reynolds et al. |
| 2010/0125516 A1 | 5/2010 | Wankmueller et al. |
| 2011/0238464 A1 * | 9/2011 | Dasgupta ................. G08G 1/14 705/13 |

FOREIGN PATENT DOCUMENTS

| | | | | |
|---|---|---|---|---|
| JP | 2002008981 A | * | 1/2002 | .............. C30B 25/12 |
| KR | 20030023865 A | * | 3/2003 | ........... G06Q 20/425 |
| KR | 20060003849 A | * | 1/2006 | ........... G06Q 20/385 |
| WO | WO-2005081512 A1 | * | 9/2005 | ............ G07F 7/1008 |
| WO | WO-2006063628 A1 | * | 6/2006 | ......... G06Q 20/3821 |

* cited by examiner

| VPAN 502 | PAN 504 | STATIC CARD VERIFICATION CODE 506 | COUNTER 508 | VPAN EXPIRY 510 |
|---|---|---|---|---|
| 5555-5555-5555-5555 | 5422-4343-2324-1332 | 432 | 0 | 04/01/2009 |
| 5555-5457-4361-3243 | 5489-2382-1818-4343 | 312 | 4 | 04/30/2009 |
| 5555-5929-3453-1242 | 5982-2381-2848-1281 | 647 | 9 | 05/4/2009 |
| 5555-2438-3422-4629 | 5808-2428-5421-0938 | 321 | 0 | 03/28/2009 |

METHODS AND SYSTEMS FOR SECURE MOBILE DEVICE INITIATED PAYMENT USING GENERATED IMAGE DATA

CROSS-REFERENCE TO RELATED APPLICATIONS

This application is a continuation of U.S. application Ser. No. 15/850,703, filed Dec. 21, 2017, which is a divisional of U.S. application Ser. No. 12/475,735, filed Jun. 1, 2009, and claims the benefit of and priority to U.S. Provisional Patent Application Ser. No. 61/114,593, filed Nov. 14, 2008, which are incorporated herein by reference for all purposes.

BACKGROUND

Mobile telephones and other mobile communications devices (such as personal digital assistants) are carried by millions of consumers. There have been a number of attempts to integrate payment applications with these mobile devices. Some of these attempts require substantial changes to existing payment authorization systems, making it difficult to achieve widespread adoption of mobile payments.

It would be desirable to provide a mobile payment system which uses existing payment authorization systems. It would further be desirable to provide mobile payment transactions which are secure and in which the cardholder's presence may be confirmed.

BRIEF DESCRIPTION OF THE DRAWINGS

FIG. 5 is a tabular view of a portion of a VPAN database in accordance with some embodiments of the present invention.

DESCRIPTION

Figure 1A:
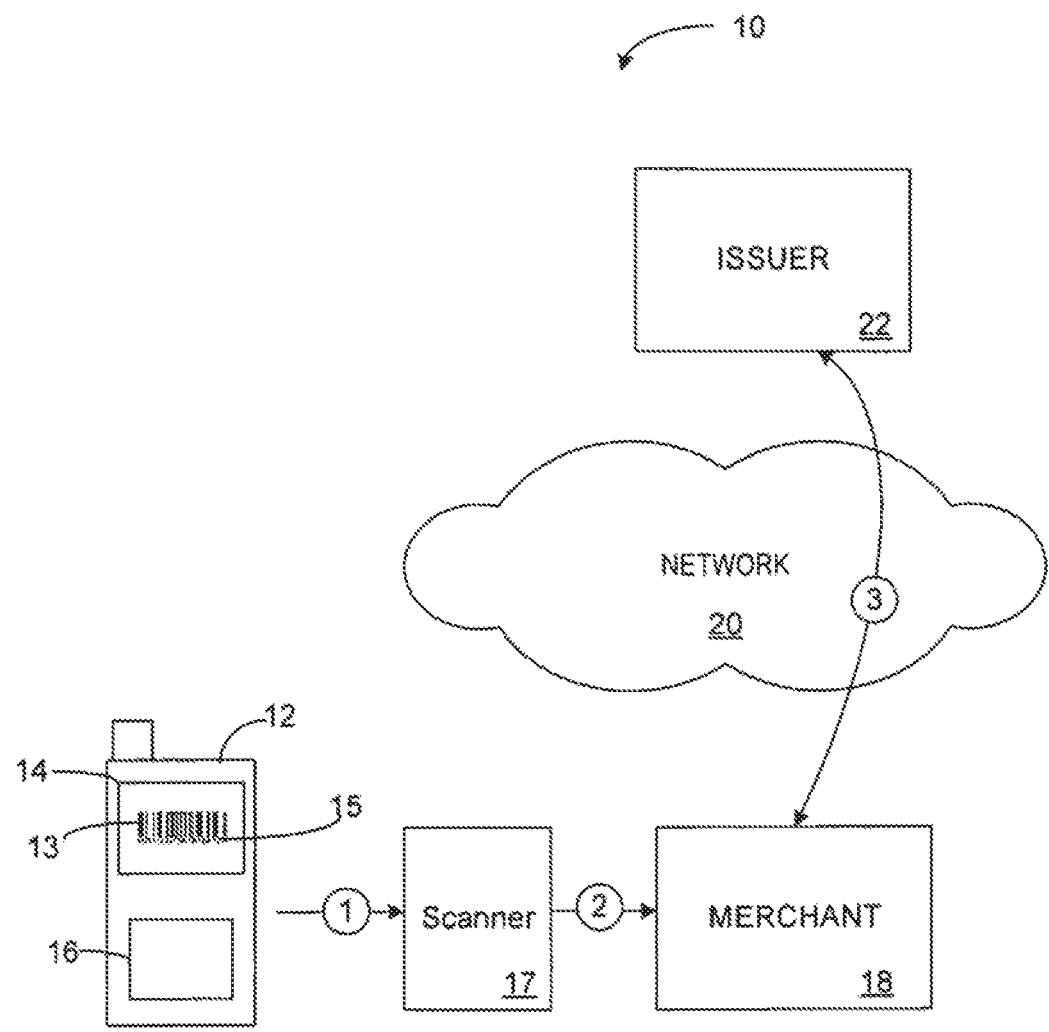
FIGS. 1A-1B are block diagrams depicting payment systems configured pursuant to some embodiments.

Embodiments of the present invention relate to systems, methods, processes, computer program code, and means for using mobile devices to conduct payment transactions over a network. In some embodiments, the mobile device can be used to conduct payment transactions involving credit, debit, stored value or other payment accounts. Pursuant to some embodiments, systems, methods, processes, computer program code and means for conducting a payment transaction include activating a payment application of a mobile device, generating, using the payment application, an optical image representing payment account information associated with said payment application, said payment account information including at least one of a payment account number, an expiry date of said payment account number, and a dynamic verification code generated by said payment application; and presenting said optical image to a merchant transaction terminal for scanning to conduct said payment transaction. Pursuant to some embodiments, the optical image is generated on an individual transaction basis, so that a different image is created for each transaction.

In some embodiments, the optical image is displayed on a display device of the mobile device. In some embodiments, activation of the payment application causes the generation of a static payment account number (PAN), an expiry date, and a dynamic code. Pursuant to some embodiments, a human-readable version displays a VPAN, expiry date, and dynamic code on the display device. In some embodiments, activation of the payment application causes the generation of a static virtual payment account number (VPAN), an expiry date, and a dynamic code. Pursuant to some embodiments, a human-readable version of the static VPAN, expiry date, and dynamic code is displayed on the display device. Pursuant to some embodiments, the human-readable version of a PAN or a VPAN, expiry date, and dynamic code are displayed in conjunction with the optical image. Pursuant to some embodiments, the optical image is a bar code image, and presenting the optical image includes presenting the optical image to a bar code scanner associated with the merchant transaction terminal.

In some embodiments, if the scanning of the optical image fails or is unable to be processed by the merchant transaction terminal, processing continues with a secondary transaction attempt using the static VPAN.

Pursuant to some embodiments, systems, methods, processes, computer program code and means for operating a point of sale terminal to authorize a transaction are provided which include identifying an amount due in a transaction, optically scanning an image displayed on a portable device associated with a buyer, the image representing payment account information associated with a payment account, the payment account information including at least one of a payment account number, an expiry date of the payment account number, and a dynamic verification code generated by an application associated with the portable device for the transaction, generating an authorization request message including at least the amount due and the payment account information, and submitting the authorization request message to a payment network for authorization.

For clarity and ease of exposition, a number of terms are used herein. For example, the term "cardholder" is used to refer to an individual who has been issued a payment account that may be used to conduct payment transactions. For example, in some embodiments, the payment account may be a debit or credit account which is accessible by a debit card or a credit card (or other device). As used herein, the term "issuer" is used to refer to a financial institution that has issued a payment account to a cardholder. For example, an issuer may be a bank that issues a credit card account to a cardholder, and provides the cardholder with a credit card to access the account.

As used herein, the term "primary account number" (or "PAN") is used to refer to a number of digits (or characters) which identity a payment account issued by an issuer. For example, in embodiments where a payment account is a credit card account which is issued by a financial institution pursuant to the Mastercard International Incorporated rules, the PAN may be a sixteen-digit string that identifies both the issuer (based on the first 5 digits of the string) and the payment account number at the issuer. The PAN is used to route and process transactions that involve the payment card and the payment account. Those skilled in the art will appreciate that other primary account number schemes and formats may be used in conjunction with embodiments of the present invention.

The term "mobile device" is used to refer to a handheld or portable device carried or used by a cardholder. In the context of embodiments of the present invention, a "mobile device" is a device that has a payment application stored, loaded or otherwise installed in or on the device such that the cardholder may conduct payment transactions involving a payment account pursuant to embodiments of the present invention. Other terms will be introduced throughout the specification to illustrate features of some embodiments.

As used herein, the term "optical image" may include an image that is readable by a scanner such as, for example, a bar code scanner. In some embodiments, the optical image is a bar code formatted in accordance with a standard such as the "GS1 Data Bar Expanded", or "Data Bar Expanded" stacked bar code standards. However, those skilled in the art will appreciate that other bar code or optical image formats or standards may be used, so long as a merchant terminal is able to optically read the image data generated by a payment application of a mobile device.

As used herein, the term "payment network" is used to refer to one or more networks that are used to process a payment transaction. For example, a payment network may be the BankNet® processing network operated by Mastercard International Incorporated. Those skilled in the art will appreciate that other networks may also be used to facilitate the authorization, clearing and settlement of payment transactions conducted using the present invention.

Pursuant to some embodiments, mobile devices (such as mobile telephones or the like) are provided with (or are updated to include) a payment application which allows the generation and storage of payment information. Pursuant to some embodiments, the payment application allows the mobile device to function in accordance with a payment standard such as the PayPass® standard promulgated by Mastercard International Incorporated. In general, the payment application may be configured to operate in accordance with any known or yet to be known payment standard, so long as the payment application allows the generation and/or secure storage of payment data which can be used to conduct transactions.

For example, the payment application, in some embodiments, is configured to operate in accordance with the PayPass standard so that the payment application can generate data identifying a payment account number ("PAN"), an expiry date of the PAN, and a dynamic code (such as a CVC or CVV code and other data) associated with the payment account. Pursuant to some embodiments, the data is used to produce a dynamic optical image (such as a bar code image) which is displayed on a display device of the mobile device. Pursuant to some embodiments, the dynamic optical image is created on a transaction-by-transaction basis. That is, the dynamic optical image may be generated by the payment application for a particular transaction. Different transactions may have different dynamic optical images. For example, each optical image may be made "unique" or different for each transaction by using a dynamic variable (such as a transaction counter) that changes for each transaction which is used in the generation of additional dynamic transaction output such as a dynamic card validation code. The dynamic bar code image is then read or scanned by a merchant terminal. The merchant terminal uses standard bar code reading software to decode the dynamic bar code image and then uses the resulting data to complete the purchase transaction (e.g., by creating a payment authorization request message in which the payment account is identified by the PAN from the dynamic bar code image).

Features of some embodiments of the present invention will be described by reference to FIG. 1A, which is a block diagram of a system 10 pursuant to some embodiments. As shown, a payment account holder or customer (hereinafter, the "customer") may have or use a mobile device 12 (such as a mobile telephone or the like). The mobile device 12 has a display screen 14 and a data entry device 16 (such as a keypad or touch screen). Pursuant to embodiments of the present invention, the customer may use the mobile device 12 to conduct a purchase transaction with a merchant 18. The merchant 18 has one or more terminals which are configured with optical scanner devices 17. For example, the optical scanner device may be a bar code scanner, such as the type typically used to scan bar code images from products at the point of sale. Pursuant to some embodiments, the optical scanner device 17 is adapted to scan a bar code image 13 that is displayed on the display screen 14 of a mobile device 12.

Pursuant to some embodiments, the bar code image 13 displayed on the display screen 14 is generated by a payment application stored in a memory of the mobile device 12. In some embodiments, the customer activates the payment application by interacting with a data entry device 16. In some embodiments, the payment application is activated when the customer desires to conduct a payment transaction at a merchant location which has an optical scanner such as device 17. In one embodiment, the payment application, when launched by the user, requires entry of a password or other code to activate the payment application (e.g., the user must enter a password to cause the payment application to proceed with generating a dynamic bar code image for use in conducting a payment transaction). This provides evidence that the account holder is present for the transaction without impacting the merchant point of sale infrastructure.

When activated, the payment application causes the creation and display of a bar code image on display device 14. The bar code image is, in some embodiments, a one-time use image which is formed by data stored in a chip card installed in the mobile device 12 or from a software application stored in the mobile device 12. In some embodiments, the data which is represented by the bar code image is equivalent to the "track 2" data of a typical payment card. For example, in an embodiment in which the payment application is designed for use in payment card transactions pursuant to Mastercard International Incorporated standards, the data represented by the bar code image may include:

(1) An identification number (the "PAN"), which is a variable number representing the account to be accessed for the transaction. The PAN may be up to 19 digits in length.

(2) A field separator (to indicate the end of the PAN and the beginning of the next field).

(3) An expiration date of the PAN (e.g., in YYMM format).

(4) Discretionary data, including a dynamic variable which may include the value of a transaction counter (from the payment application), and a computed dynamic variable such as a cryptographic checksum (used to ensure the uniqueness of each bar code image). The dynamic variable may be constructed using any of a number of known techniques, including, for example, the use of a shared secret key or a public key of a key pair.

The payment application of the mobile device 12 converts the data (including the PAN, expiry, and dynamic data) into a bar code image 13. The bar code image 13 displayed on the display screen 14 may be formed pursuant to any of a number of standards. For example, in some embodiments, the bar code image is formed in accordance with the "GS1 Data Bar Expanded" standard (e.g., as specified by ISO Standard ISO/IEC 24724:2006). Such bar code images are one dimensional images that have a maximum encoding capacity of 74 numerics. Pursuant to some embodiments, encoding track 2 payment account data requires use of approximately 38 numeric digits (including the PAN, expiry, and dynamic data). Other bar code image formats may also be used (e.g., such as two-dimensional bar codes or other image formats that can hold at least 38 numeric digits of data and that are commonly used at merchant point of sale terminals). Pursuant to some embodiments, the use of image standards which support omnidirectional scanning are preferred; however, other standards which use unidirectional scanning may also be used. By allowing merchants to use their existing scanning equipment, embodiments allow ready adoption of payments using mobile devices configured pursuant to the present invention. Pursuant to some embodiments, an application or interface may be added to the scanning software to interpret the payment data encoded in the bar code image and to ensure the payment data is routed for transmission to a payment network 20 for authorization processing.

Pursuant to some embodiments, the payment network 20 may be an existing payment network such the BankNet® payment network operated by Mastercard International Incorporated. As is known to those of skill in the art, such payment networks allow merchants to transmit payment authorization request messages that are routed to issuers (such as issuer 22) or their agents for authorization (or denial) of payment transactions. Embodiments of the present invention allow the merchant 18 to create an authorization request message which contains a PAN, expiry date, and dynamic data received from a mobile device 12. The authorization request message may be generated and transmitted using existing payment network infrastructure, allowing ready integration and use of mobile devices in payment transactions.

In some situations, a merchant point of sale location may not be capable of reading the bar code image 13. For example, a merchant location may not have a scanner which is able to successfully read the bar code image. Or, the transaction may not be at a physical retail location (e.g., the transaction may be an Internet or telephone transaction). In such situations, a second payment account identifier, which may be different than the payment account identifier encoded in the bar code, may be used which is generated by the payment application of the mobile device 12 and which is displayed on the display device 14 in a human-readable form. In such embodiments, a store clerk (or the customer) may key enter the payment account information while reading the data from a human-readable form 15 displayed on the display device 14 of the mobile device 12. The nature of the payment account information which is generated and used in this embodiment will be described in further detail below (e.g., at FIG. 1B). In general, however, the human-readable information will include a "static VPAN" (described below).

By providing two alternative means for generating and using payment account information, embodiments allow mobile devices to be successfully used in a wide variety of payment transactions at a wide variety of merchants. In situations where an optical bar code image may be scanned, the cardholder's PAN can be used. In situations where an optical bar code image may not be successfully scanned, a static VPAN (which is later translated to the cardholder's PAN, as discussed below) may be used. The result is a system which allows widespread acceptance of payment information from mobile devices.

Figure 6:
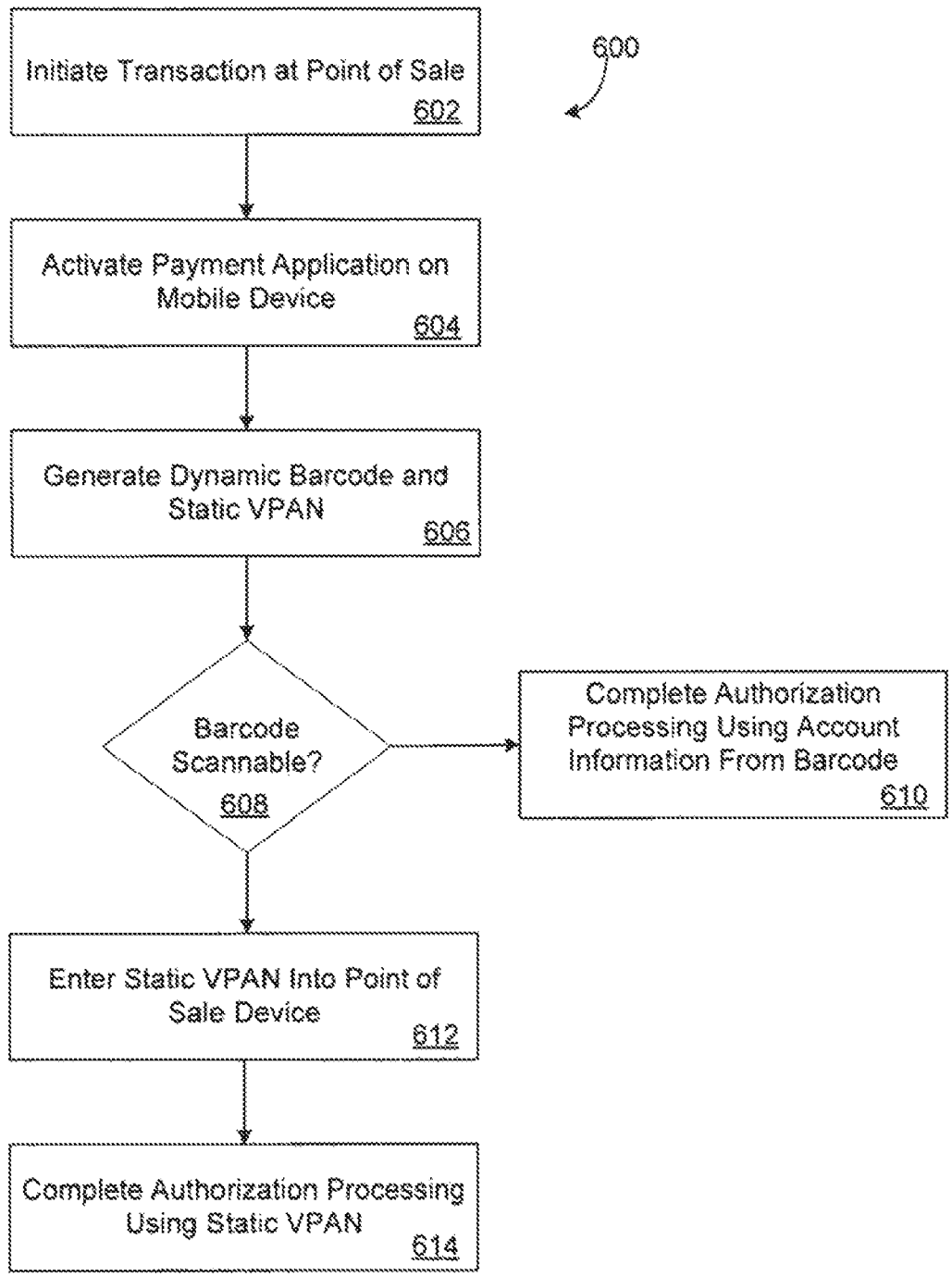
FIG. 6 is a flow diagram depicting a transaction process according to some embodiments of the present invention.

Reference will now be made to FIG. 6, where a flow diagram is shown which depicts a transaction process 600 pursuant to some embodiments. For example, the transaction process 600 may be conducted using a mobile device (such as device 12 of FIG. 1A) at a merchant location (such as the merchant 18 of FIG. 1A). Processing begins at 602 where a consumer initiates a transaction at a point of sale location. For example, the consumer may present items to purchase at a physical point of sale location, or at an Internet point of sale (such as an electronic shopping cart). Processing at 602 may involve the merchant tallying up a total purchase price and requesting payment from the consumer.

Processing continues at 604 where the consumer activates a payment application on a mobile device. Activation of the payment application may involve, for example, the consumer tapping an icon on a display screen, selecting a key or an option from a menu, etc. Activation of the payment application may also involve the consumer's entry of a password or passcode to activate the payment application. In some embodiments, activation may also involve the entry or selection of information associated with the transaction (e.g., such as a payment amount, or the type of transaction, etc.). The successful activation of the payment application causes the generation of a dynamic barcode (and, in some embodiments, a static VPAN) at 606. The generation of the dynamic barcode is described above (in conjunction with FIG. 1A) and the generation of the static VPAN is discussed below (in conjunction with FIG. 1B et seq.).

The dynamic barcode image 13 generated at 606 is displayed on a display device 14 of the mobile device 12. At 608 an attempt is made to scan the barcode image 13. If the attempt is successful (e.g., the merchant point of sale location is able to scan, and obtain the data from the image), processing continues at 610 where authorization processing of the transaction is completed using the account information from the barcode image 13. For example, processing at 610 includes the merchant systems creating a transaction authorization request which includes the purchase information as well as the payment account information (obtained from the bar code image 13), and transmitting the transaction authorization request message to a payment network for normal authorization processing (and approval or denial by the issuer of the payment account identified in the authorization request message).

If processing at 608 indicates that the barcode is not scannable for some reason (e.g., the merchant's point of sale may be incapable of scanning the image, etc.), processing continues at 612 where the static VPAN 15 (which is displayed in plain text on a display device 14 of the mobile device 12 along with an expiry date and dynamic data) is entered into the point of sale device (e.g., it may be key entered by a clerk, or by the customer). Processing continues at 614 where the static VPAN (and expiry and dynamic data) are used to create a transaction authorization request message that is transmitted from the merchant to a payment network for authorization processing. The processing of a static VPAN will be described further below, however, the general result is that the issuer of a payment account will either approve or deny the purchase transaction. By providing such an alternative payment approach, mobile devices may be used in a variety of different payment transactions.

Details of features of the static VPAN will now be described. Pursuant to a second embodiment of the present invention, the payment application of the mobile device may also store at least one static virtual payment account number (or "VPAN"). In some embodiments, the VPAN may be used as a backup (or alternative) to the optical image of the PAN. For example, the VPAN may be used to conduct transactions at locations where an appropriate or compatible bar code scanner is not available. Pursuant to some embodiments, the VPAN account may have its own virtual expiry date. An authorized user of the payment application may access the VPAN and use it to make a purchase transaction (e.g., at a physical merchant location or an electronic commerce location or a mail order merchant). The authorized user provides the VPAN, along with its expiry date, and a dynamic code (generated by the payment application) to the merchant and the merchant routes the VPAN, expiry date, dynamic code, and other transaction information to a payment provider (e.g., using existing payment authorization systems).

The payment provider uses the VPAN to look-up an actual PAN associated with a payment account of the customer, and confirms the validity of the dynamic code. A second authorization request message is then created with the actual PAN and the transaction information. The second authorization request is routed to the issuer of the customer's payment account for authorization. If the transaction is authorized, the authorization response is returned to the payment provider. The payment provider replaces the actual PAN with the VPAN and returns the authorization response to the merchant so that the transaction can be completed.

Figure 1B:
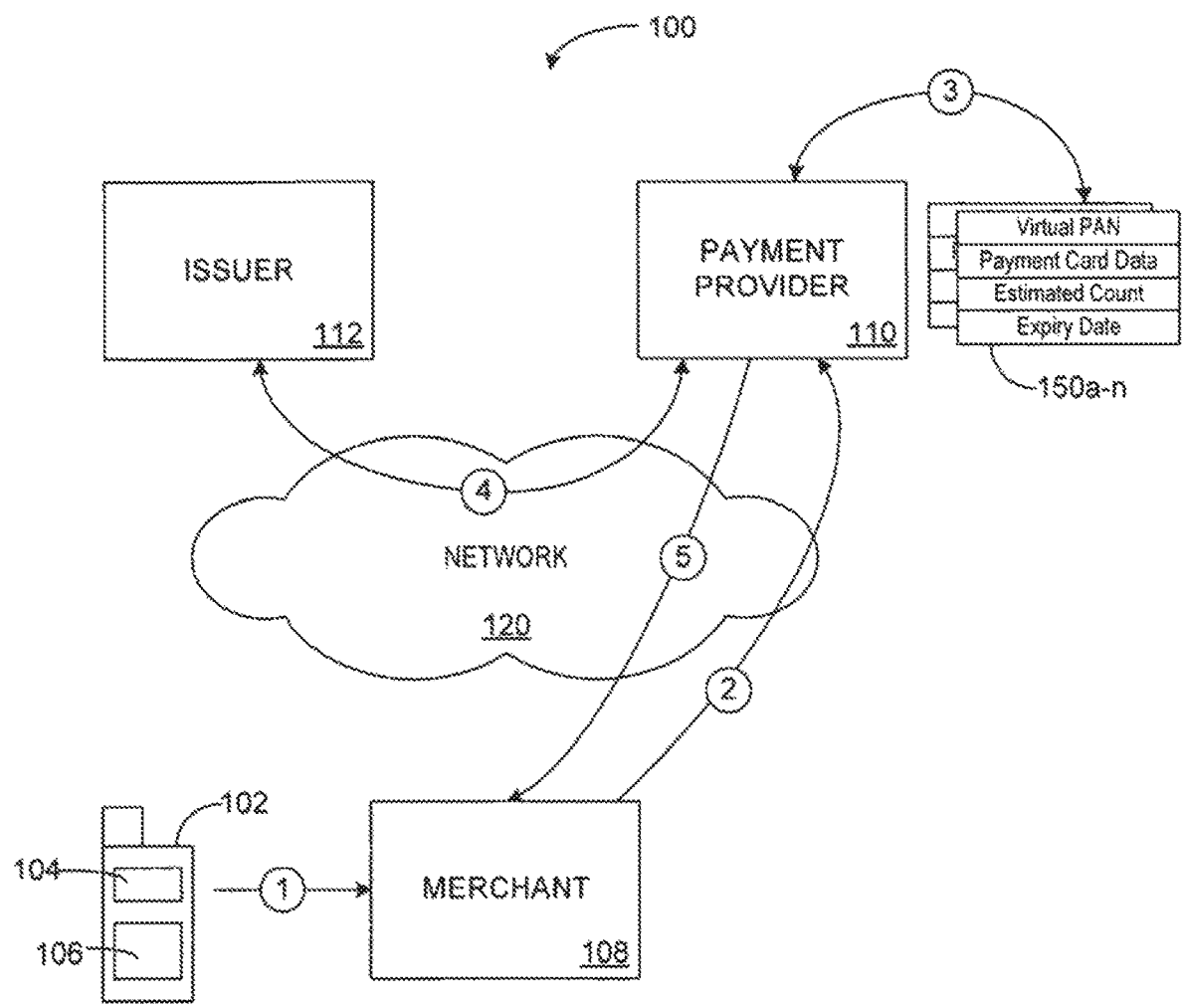

Features of a second embodiment of the present invention will now be described by reference to FIG. 1B, which is a block diagram of a system 100 pursuant to some embodiments. As shown, a payment account holder or customer (hereafter, the "customer") may have or use a mobile device 102 (such as a mobile telephone or the like). The mobile device 102 has a display screen 104 and a data entry device 106 (such as a keypad or touch screen). Pursuant to embodiments of the present invention, the customer may use the mobile device 102 to conduct a purchase transaction with a merchant 108. The merchant 108 may be a physical storefront or electronic commerce merchant.

In a typical example transaction, a customer may purchase products or services from the merchant 108 by interacting with a payment application (installed in or on the mobile device 102) to cause the generation of a static VPAN on the mobile device 102. In some embodiments, the payment application also generates an expiration date associated with the static VPAN. In some embodiments, the payment application also generates a dynamic account validation code. In some embodiments, the dynamic account validation code has the same format as existing dynamic card validation codes found on physical payment cards. The VPAN, the expiration date, and the dynamic account validation code are provided to a clerk operating a point of sale terminal, who keys in the information as if it were being copied from a normal payment card.

In some embodiments, such as embodiments operable in electronic commerce environments, the customer may cause the payment application in the mobile device to display a VPAN, expiration date and dynamic account validation code on a display device of the mobile device 102. The customer may read the information from the display device and then key in that data into a Web page on a computer to complete the ecommerce transaction. In some embodiments, such as embodiments involving telephone transactions, the customer may read the information from the display device of the mobile device 102 and orally convey the information to a call center operator or key the information in through a telephone keypad. In FIG. 1, the communication or provision of this VPAN to the merchant (whether it be at a physical point of sale, in an ecommerce transaction, or in a telephone transaction) is shown as transaction message number "1".

In addition to generating (or providing) the VPAN, the payment application on the mobile device 102, in one preferred embodiment, prompts the user for a password to open up, launch, or otherwise access the payment application on the mobile device. This provides evidence that the account holder of the VPAN was present during the transaction. If the user's password is verified, the payment application on the mobile device operates to generate (or otherwise provide) an expiry date and a multi digit dynamic number (hereinafter a "dynamic code"). In some embodiments, the dynamic code is a three or four digit code that may be used in place of a "CVV", "CVC" or other code (a code generally used in payment card systems and used to verify that a cardholder was in possession of a payment card during a transaction).

In some embodiments, the dynamic code is generated in the payment application of the mobile device 102 based on a secret key stored in the payment application (e.g., by an issuer of a payment account held by the cardholder) when the payment application and the VPAN are loaded into the mobile device 102. The dynamic code is, in some embodiments, generated based on the secret key and the value of a transaction counter. For example, each payment application may have a transaction counter that increments each time the payment application is used to conduct a transaction using a VPAN. Once the payment application has retrieved or generated the VPAN, the expiry date, and the dynamic code for the transaction, the data elements are displayed on a display device 104 of the mobile device 102 and the customer provides the data elements to the merchant 108.

In some embodiments, the dynamic code is not generated in the payment application of the mobile device 102 but is taken from a pre-populated list of dynamic codes stored in the payment application (e.g., by an issuer of a payment account held by the cardholder) when the payment application and the VPAN are loaded into the mobile device 102.

The merchant 108 enters the data elements (including the VPAN, the expiry date and the dynamic code) into a point of transaction terminal (e.g., such as a POS terminal) and causes the creation of an authorization request message in the format required by the payment networks used by the merchant systems. The authorization request message is transmitted (at message "2" in FIG. 1) from the merchant 108 to a payment provider 110. The authorization request message may include, for example, the VPAN, the expiry date, and the dynamic code generated by the mobile device 102 as well as the transaction details associated with the current purchase transaction.

The authorization request message is transmitted through a network 120 (such as a payment association network, e.g., the BankNet® network operated by Mastercard International Incorporated). Pursuant to some embodiments, the authorization request message is routed to a payment provider 110 such as a server device or system operated to manage and administer transactions involving embodiments of the present invention. In some embodiments, the authorization request message is routed through the network 120 based on data in the VPAN. For example, each VPAN may have a four or five leading digits which serve to identify the payment provider 110 as the "issuer" of the VPAN. Those skilled in the art will appreciate that an authorization request involving a payment card is typically transmitted to the payment card issuer for authorization. In embodiments of the present invention, authorization requests involving VPANs are routed, instead, to a payment provider 110.

The payment provider 110, upon receiving the authorization request, uses the VPAN in the authorization request to look-up a data record (such as the data record illustrated as 150) which includes details associated with the VPAN, including, for example, information from an associated physical payment card with the physical payment card's expiry date and physical card's static card verification code and a value (or range of values) identifying an expected counter value. The expected counter value may be used to confirm the likely validity of the dynamic value generated by the mobile device 102. An example of a database that could store a data record 150 is shown and discussed below at FIG. 5.

Because the payment provider 110 may not know the exact value of the counter in each mobile device 102, the payment provider 110 may generate a series of expected dynamic values based on the general range of counter values the payment provider expects from a particular mobile device. For example, if a mobile device 102 has engaged in 10 prior transactions using VPANs, the payment provider 110 may generate a range of expected dynamic values using ten counter values from 10 and 20. The resulting ten expected dynamic values are then compared to the received dynamic value. If the dynamic value received from the mobile device 102 is equal to one of the ten expected dynamic values, the transaction may continue. If the dynamic value received from the mobile device 102 is not equal to one of the ten expected dynamic values, then the transaction may be declined (e.g., by returning a denial response in message "5").

If the dynamic value received from the mobile device 102 is equal to one of the expected dynamic values, the payment provider 110 continues processing the transaction by creating an updated authorization request in which the VPAN is replaced with the PAN of the payment card registered for that VPAN by the customer plus the expiry date of the real physical card. In some embodiments, a CVC or other static values associated with the customer's physical payment card is also included in the updated authorization request. The updated authorization request is then routed, via the network 120, to the issuer of the customer's physical payment card. The issuer 112, upon receipt of the updated authorization request, performs normal authorization processing to determine if the payment transaction can be authorized. An authorization response is then returned to the payment provider (e.g., at message "4").

The payment provider then creates an updated authorization response message by replacing the PAN of the customer's physical payment card with the VPAN previously received. The updated authorization response is then returned to the merchant 108 to complete the transaction. In this manner, mobile devices (and their processing power) may be used to generate and simply display, to the merchant clerk (for face to face transactions) or to the customer (for ecommerce transactions) the three primary pieces of payment data (a PAN, an expiry date, and a card verification code that is the same format as normal) that are used in existing payment card networks and to initiate key entered payment transactions involving payment cards. An important aspect of some embodiments of the present invention is that the keyed in card verification code is dynamic and is checked by payment provider 110, not by issuer 112 of the physical card. In this manner, payment card issuers are not required to deploy or implement new processes to validate or support the dynamic card codes, nor are they required to implement new systems to track or generate VPANs. Further, embodiments ensure that merchants are not made aware of the actual payment card information, as they are only exposed to the VPAN information.

Figure 2:
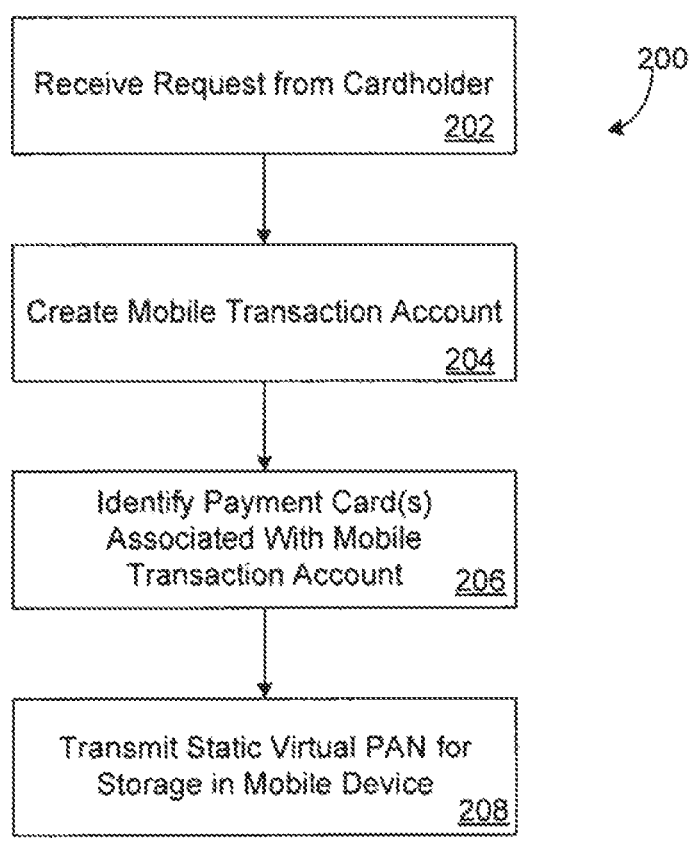
FIG. 2 is a flow diagram depicting a cardholder registration process pursuant to some embodiments.

Pursuant to some embodiments, prior to conducting a transaction using a VPAN, a cardholder must first register a payment card with the payment provider 110, and install (or activate) a payment application on a mobile device. One process for registration and activation is shown in FIG. 2, where a process 200 is shown. Process 200 may be performed by a cardholder to activate a payment application on a mobile device (or to install and activate a payment application onto a mobile device) and to register a payment card with payment provider 110. In some embodiments, the payment application registration and activation process may also be used to install any application software, keys, or other code needed to generate the dynamic bar code images (e.g., as described in conjunction with FIG. 1A and FIG. 6).

Process 200 begins at 202 where the cardholder contacts the payment provider 110 (or an agent of the payment provider). The cardholder may contact the payment provider 110 from a mobile device that has (or will have) the payment application installed thereon, or the cardholder may contact the payment provider 110 from a computer over the Internet or the like.

Once the cardholder contacts the payment provider, processing continues at 204 where the cardholder is walked through a menu of options to create a mobile transaction account. For example, the cardholder may be prompted for personal information to verify the cardholder's identity, and may be prompted for information needed to create the mobile transaction account.

Processing continues at 206 where the cardholder is prompted to identify one or more payment card accounts to be associated with the mobile transaction account. The payment card account(s) will be used to complete transactions processing using the system.

Processing continues at 208 where the payment provider 110 creates a VPAN and a VPAN record (e.g., such as shown in item 150 of FIG. 1) and delivers the VPAN to the cardholder's mobile device. In some embodiments, the mobile phone application with the VPAN and other data is transmitted to the cardholder's mobile device using over the air ("OTA") techniques. In some embodiments, the VPAN is packaged in a payment application and delivered and installed on the cardholder's mobile device. Processing at 208 may also include the generation and delivery of a shared secret key for use by the payment application in generating a dynamic code value as described above. Once the VPAN and payment application have been installed on the mobile device, the cardholder may use the mobile device to complete transactions pursuant to the present invention.

Figure 3:
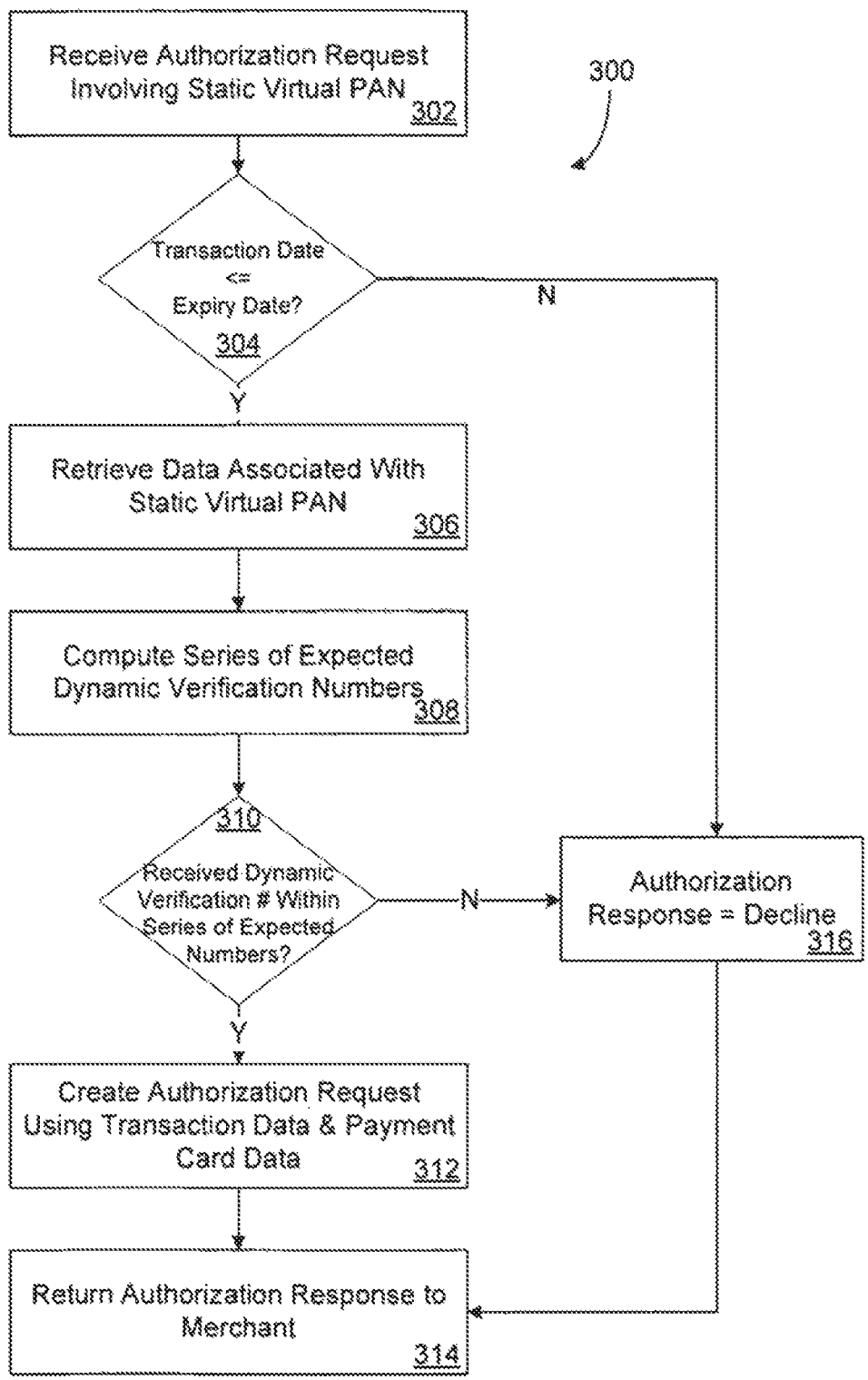
FIG. 3 is a flow diagram depicting a transaction process pursuant to some embodiments.

Reference is now made to FIG. 3, where a process 300 for conducting a mobile transaction pursuant to some embodiments is described. Process 300 may be performed by a payment processor such as the payment processor 110 of FIG. 1. For example, process 300 may be performed in response to authorization requests received by the payment processor 110 involving transactions at merchants where a VPAN was provided by a cardholders.

Processing begins at 302 where an authorization request involving a VPAN is received. At 304, an initial determination may be made whether the transaction date is prior to the expiry date of the VPAN. If not, processing may continue at 316 where an authorization denial may be created. If the transaction date is prior to the expiry date, processing continues at 306 where a mapping or look-up is performed (using the VPAN) to retrieve data associated with the VPAN (e.g., such as the data shown as item 150 of FIG. 1). Processing continues at 308 where a series of expected dynamic verification numbers are computed. At 310, a determination is made whether the dynamic code received in the authorization request is within the series of computed (or expected) codes. If not, the transaction may be denied and processing may continue at 316 where an authorization response denying the transaction is generated. If the determination at 310 indicates that the dynamic code received in the authorization request is within the series of computed (or expected) codes, processing continues at 312 where an updated authorization request is created using the transaction data (received at 302) and the payment card information retrieved at 306. The updated authorization request is transmitted to the issuer and a response is received and returned to the merchant at 314.

Figure 4:
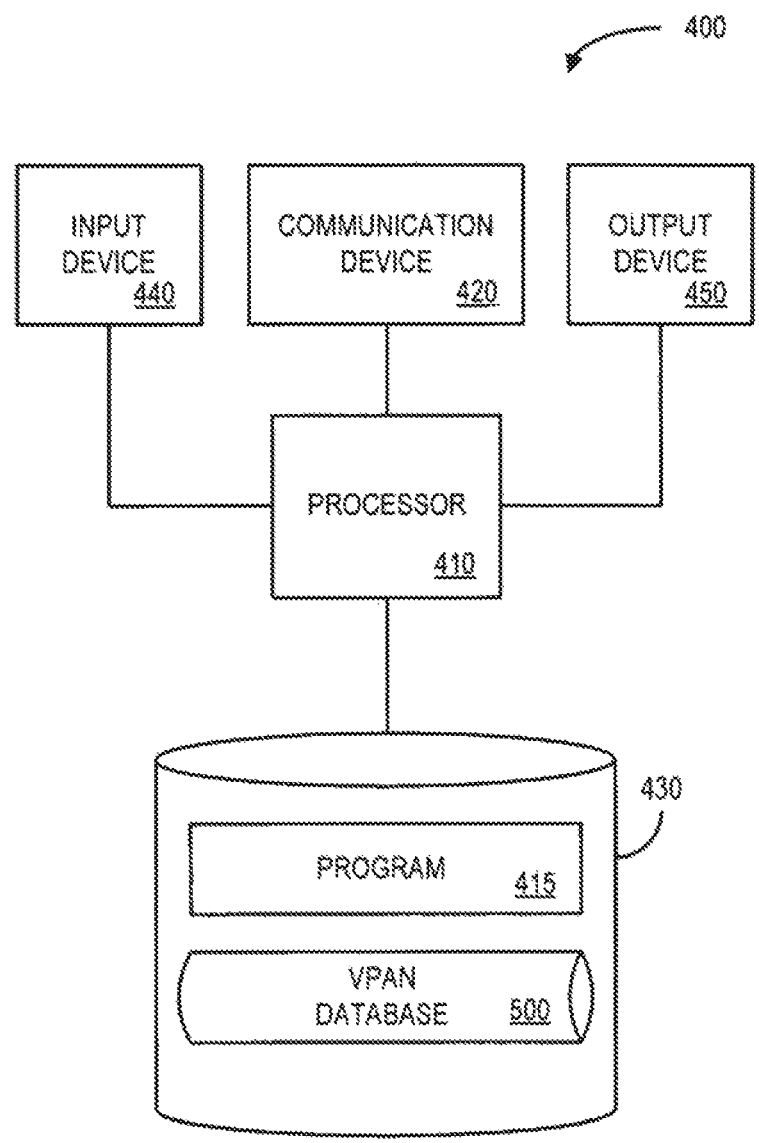
FIG. 4 is a block diagram depicting a payment provider device configured pursuant to some embodiments.

FIG. 4 illustrates payment provider device 400 that might be descriptive, for example, of the payment provider device 110 illustrated in FIG. 1 in accordance with an exemplary embodiment of the invention. The payment provider device 400 comprises a processor 410, such as one or more INTEL® Pentium® Processors, coupled to a communication device 420 configured to communicate via a communication network (not shown in FIG. 4). The communication device 420 may be used to communicate, for example, with one or more merchants, acquirers, issuers, and cardholders.

The processor 410 is also in communication with an input device 440. The input device 440 may comprise, for example, a keyboard, a mouse, or computer media reader. Such an input device 440 may be used, for example, to enter information about cardholders participating in the system or to perform administrative actions associated with the management and administration of the payment provider device 400. The processor 410 is also in communication with an output device 450. The output device 450 may comprise, for example, a display screen or printer. Such an output device 450 may be used, for example, to provide reports and/or display information associate with cardholder registrations and the usage or administration of cardholder data.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 430 stores a program 415 for controlling the processor 410. The processor 410 performs instructions of the program 415, and thereby operates in accordance any embodiments of the present invention described herein. For example, the processor 410 may receive, via the communication device 420, a request from a cardholder to register a payment card and to activate a payment application on a mobile device (e.g., such as a registration request in accordance with the process of FIG. 2). As another example, the processor 410 may receive, via the communication device 420, a transaction authorization request from a merchant or an acquirer (e.g., such as an authorization request process in accordance with the process of FIG. 3). As another example, the processor 410 may also transmit and receive (via the communication device 420) an authorization request, and an authorization response to and from an issuer (such as the issuer 112 of FIG. 1).

The processor 410 may also operate with the program to retrieve data from a storage device (e.g., to retrieve data associated with a static VPAN received from a merchant) and to compute a series of expected dynamic verification numbers associated with the static VPAN to determine whether a transaction should be declined or whether an authorization request should be created and transmitted to an issuer. Moreover, the processor 410 may match this information using one or more rules or formulas.

As used herein, information may be "received" by or "transmitted" to, for example: (i) the payment provider device 400 from merchant devices, acquirers, mobile devices, issuer devices, payment network devices; or (ii) a software application or module within the payment provider device 400 from another software application, module, or any other source.

As shown in FIG. 4, the storage device 430 also stores one or more VPAN databases 500 (described with respect to FIG. 5). Examples of a VPAN database that may be used in connection with the payment provider device 400 will now be described in detail with respect to FIG. 5. The illustrations and accompanying descriptions of the databases presented herein are exemplary, and any number of other database arrangements could be employed besides those suggested by the figures.

FIG. 5 is a tabular view of VPAN database 500 in accordance with some embodiments of the present invention. The table includes entries identifying VPANs that have been issued or assigned by the payment provider 110. The table also defines fields 502, 504, 506, 508, 510 for each of the VPAN entries. The fields specify: a VPAN 502, a PAN 504, a static card verification code 506, a counter 508, and a VPAN expiry date 510. The information in the database 500 may be created and updated based on information received from cardholders, mobile devices operated by cardholders, merchants and issuers.

The VPAN 502 may be, for example, an alphanumeric code (typically, in current systems, a sixteen digit numeric code) assigned by the payment provider to a cardholder for the cardholder's use in making certain transactions pursuant to embodiments of the present invention. In some embodiments, VPANs issued or assigned by a payment provider are formatted in accordance with a payment network's formatting rules. As a specific example, for VPANs processed over the payment network operated by Mastercard International Incorporated, VPANs are 16 digit numeric codes in which the first 6 digits are used to identify the VPAN as a VPAN to be routed to a payment provider 110 for processing. For example, as illustrated in FIG. 5, the first six digits of each of the VPANs have identical formats: "5555-55". Such a convention may be used to ensure that transactions involving a VPAN are routed to the payment provider 110 for processing. Those skilled in the art will appreciate that other routing, numbering, and formatting conventions may be used so long as a payment network may reliably identify transactions involving a VPAN as such.

As shown in FIG. 5, each VPAN 502 is associated with a PAN 504. That is, each VPAN 502 is associated with an actual payment account number that has been issued to a cardholders Each VPAN 502 is also associated with the static card verification code 506 from the payment account. For example, in the case of a Mastercard payment card, the static card verification code 506 may be the Mastercard CVC number printed on the back face of a Mastercard credit or debit card. Pursuant to some embodiments, the PAN 504 and the static card verification code 506 are obtained from a cardholder when the cardholder registers to use a payment card in a system of the present invention (e.g., using a registration process such as the process 200 of FIG. 2). Other static card verification codes may also be used (e.g., such as the codes used by other payment card brands).

Each VPAN 502 is also associated with one or more counters 508. The counter may, for example, increment each time a VPAN 502 is used in a transaction. As discussed above in conjunction with FIG. 1, the counter 508 is used to confirm the likely validity of a dynamic value generated by a payment application in a mobile device when and transmitted from a mobile device to a merchant and then from the merchant to the payment provider 110 in an authorization request. In some embodiments (not shown in FIG. 5), a secret key shared by the payment provider 110 and a mobile device 102 (and stored, for example, in a payment application installed in the mobile device 102) may also be stored in the database of FIG. 5. The shared secret key may be used to encrypt a dynamic value transmitted from the mobile device. The payment provider 110 may use the shared secret key, in conjunction with the counter 508, to decrypt the dynamic value from the mobile device 102 to ascertain the authenticity of the transaction request.

Each VPAN 502 is also associated with a VPAN expiry date 510. The VPAN expiry date 510 may be set when the VPAN 502 is originally issued or assigned to a cardholder and limits the period in which the VPAN 502 may be used in transactions. Payment provider 110 may consult the VPAN expiry date 510 as described above in conjunction with FIG. 3 to determine whether to deny an authorization request (or to allow further authorization processing to proceed).

The above descriptions of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for operating a point of sale terminal of a merchant to authorize a payment transaction, the method comprising:
    optically scanning, by an optical scanning device of the point of sale device of the merchant, a unique dynamic optical image displayed on a portable device associated with a buyer, said unique dynamic optical image includes, encoded therein, payment account information associated with a payment account, said payment account information including (i) a payment account number, (ii) an expiry date of said payment account number, and (iii) a dynamic verification code generated by an application installed on said portable device for said payment transaction, wherein the dynamic verification code encoded in said unique dynamic optical image varies per payment transaction;
    decoding, by a payment processing device of the point of sale device, the unique dynamic optical image to extract the payment account information encoded therein for processing by the point of sale device.

2. The method of claim 1, further comprising:
    generating, by the payment processing device, an authorization request message, said authorization request message including at least said decoded payment account information;
    transmitting, by a communication device, said generated authorization request message to a payment network for authorization of said payment transaction;
    receiving, from said payment network, an authorization response message; and
    completing said payment transaction based on said authorization response message.

3. The method of claim 2, wherein the payment processing device generates the authorization request message in a format required by the payment network.

4. The method of claim 2, wherein the generated authorization request is routed through the payment network to an issuer of the payment account.

5. The method of claim 1, wherein said unique dynamic optical image is a bar code.

6. The method of claim 1, wherein said unique dynamic optical image is a bar code formatted in accordance with a standard including one of GS1 Data Bar Expanded or Data Bar Expanded stacked bar code standards.

7. A point of sale system, comprising:
    a scanner, for scanning a unique dynamic machine readable image from a display of a mobile device to process a payment transaction;
    a computer processor for executing program instructions and for receiving the scanned unique dynamic machine readable image from the scanner, wherein said unique dynamic machine readable image includes, encoded therein, payment account information associated with a payment account, said payment account information including (i) a payment account number, (ii) an expiry date of said payment account number, and (iii) a dynamic verification code generated by an application associated with said mobile device for said payment transaction, wherein the dynamic verification code encoded in said unique dynamic optical image varies per payment transaction; and
    a memory, coupled to the computer processor, for storing program instructions for execution by the computer processor, said program instructions including instructions to decode said scanned unique dynamic machine readable image and extracting the payment account information encoded therein for processing by the point of sale device.

8. The point of sale system according to claim 7, wherein said program instructions to generate a payment authorization request message including the decoded payment information.

9. The point of sale system according to claim 8, further comprising a communication device, coupled to the computer processor, for transmitting said generated payment authorization request message to a payment network for authorization processing of said payment transaction.

10. The point of sale system according to claim 9, wherein the computer processor generates the authorization request message in a format required by the payment network.

11. The point of sale system according to claim 10, wherein the generated payment authorization request message is transmitted to the payment network for routing to an issuer of the payment account.

12. The point of sale system according to claim 6, wherein unique dynamic machine readable image is a bar code.

13. The point of sale system according to claim 6, wherein unique dynamic machine readable image is a bar code is formatted in accordance with a standard including one of GS1 Data Bar Expanded or Data Bar Expanded stacked bar code standards.

* * * * *